(12) United States Patent
Vissiere et al.

(10) Patent No.: US 11,415,420 B2
(45) Date of Patent: Aug. 16, 2022

(54) METHOD AND DEVICE FOR CHARACTERISING A HEADING DETERMINED FROM THE MEASUREMENT OF THE MAGNETIC FIELD

(71) Applicant: SYSNAV, Vernon (FR)

(72) Inventors: David Vissiere, Paris (FR); Mathieu Hillion, Vernon (FR); Charles-Ivan Chesneau, Paris (FR); Jean-Philippe Dugard, Vernon (FR)

(73) Assignee: SYSNAV, Vernon (FR)

( * ) Notice: Subject to any disclaimer, the term of this patent is extended or adjusted under 35 U.S.C. 154(b) by 159 days.

(21) Appl. No.: 16/634,441

(22) PCT Filed: Jul. 27, 2018

(86) PCT No.: PCT/FR2018/051940
§ 371 (c)(1),
(2) Date: Jan. 27, 2020

(87) PCT Pub. No.: WO2019/020961
PCT Pub. Date: Jan. 31, 2019

(65) Prior Publication Data
US 2020/0208980 A1 Jul. 2, 2020

(30) Foreign Application Priority Data

Jul. 28, 2017 (FR) ..................................... 1757220

(51) Int. Cl.
*G01R 33/022* (2006.01)
*G01C 21/08* (2006.01)
*G01C 21/16* (2006.01)
*G01C 21/20* (2006.01)

(52) U.S. Cl.
CPC .......... *G01C 21/08* (2013.01); *G01C 21/165* (2013.01); *G01C 21/206* (2013.01)

(58) Field of Classification Search
CPC ..... G01C 21/08; G01C 21/165; G01C 21/206
See application file for complete search history.

(56) References Cited

U.S. PATENT DOCUMENTS

2014/0297212 A1* 10/2014 Anderson ............ G01C 25/005
                                                        702/90
2018/0210039 A1*  7/2018 Shalev .................. G01V 3/165

OTHER PUBLICATIONS

"Monotonic Function," Nov. 20, 2016, Wolfram MathWorld, http://web.archive.org/web/20161120030208/https://mathworld.wolfram.com/MonotonicFunction.html. (Year: 2016).*

(Continued)

*Primary Examiner* — Mohamed Charioui
*Assistant Examiner* — Christine Y Liao
(74) *Attorney, Agent, or Firm* — Womble Bond Dickinson (US) LLP

(57) ABSTRACT

The invention relates to a method for determining a heading, in which a magnetic field is measured by at least one magnetometer and a magnetic heading is determined from said measurement and in which calculation means implement a processing calculating, for each measurement of magnetic heading, a value for characterising the heading thereby determined, characterised in that said characterisation value is a monotone function of a norm of the measured magnetic field gradient, said value being used in the determination of the heading.

15 Claims, 3 Drawing Sheets

(56) References Cited

OTHER PUBLICATIONS

Afzal et al., "Assessment of Indoor Magnetic Field Anomalies using Multiple Magnetometers", Proceedings of the 23rd International Technical Meeting of The Satellite Division of the Institute of Navigation (ION GNSS 2010), Sep. 21-24, 2010, pp. 1-9.
Afzal et al., "Magnetic field based heading estimation for pedestrian navigation environments", 2011 International Conference on Indoor Positioning and Indoor Navigation, Sep. 2011, 10 pages.
Faulkner et al., "Gps-denied pedestrian tracking in indoor environments using an imu and magnetic compass", Proceedings of the 2010 International Technical Meeting of The Institute of Navigation, Jan. 2010, 7 pages.
International Preliminary Report on Patentability received for PCT Patent Application No. PCT/FR2018/051940, dated Feb. 6, 2020, 16 pages (9 pages of English Translation and 7 pages of Original Document).
International Search Report and Written Opinion received for PCT Patent Application No. PCT/FR2018/051940, dated Nov. 9, 2018, 18 pages (9 pages of English Translation and 9 pages of Original Document).
Preliminary Research Report received for French Application No. 1757220, dated Apr. 17, 2018, 3 pages (1 page of French Translation Cover Sheet and 2 pages of original document).

\* cited by examiner

METHOD AND DEVICE FOR CHARACTERISING A HEADING DETERMINED FROM THE MEASUREMENT OF THE MAGNETIC FIELD

GENERAL TECHNICAL FIELD AND PRIOR ART

The present invention relates, generally speaking, to magneto-inertial techniques.

More precisely, it relates to the determination of heading by magnetometers.

In particular, it advantageously finds application in the case of measurements in urban areas or "indoors", that is to say inside buildings.

Conventionally, magnetometers are used for the calculation of heading in embedded systems.

In this case, the hypothesis is made that the magnetic field measured by the sensor is the Earth's magnetic field which points, for its horizontal component, to magnetic north. The difference between the direction of magnetic north and geographic north (called magnetic declination) is known and tabulated. Without loss of generality, hereafter it will thus be considered that magnetic north and geographic north are merged, and that the magnetometers thus indicate what will be called north.

Typically, the determination methods used for the calculation of heading from magnetometer measurements are based on:

a modelling that links the measurement supplied by the magnetometer and information relative to the heading of the system, a characterisation of the relevance of this relationship for the measurements carried out.

In a conventional approach, the calculation implemented may be a Kalman type filtering with the magnetic field as measurement, making it possible to reset the heading that is contained in the state, with a measurement noise that is a function of the characterisation of the relevance.

The modelling consists in writing that the measured magnetic field M contains heading information, for example by the equation $$M = R(\psi, \theta, \varphi)^T M_{EARTH}$$

where R is the rotation matrix making it possible to go from the reference frame of the object to the Earth's inertial reference frame, $\psi$, $\theta$, $\varphi$ the Euler angles and $M_{EARTH}$ the Earth's magnetic field.

The relevance of this equation is characterised by a measurement variance, that is to say that it is assumed that the error in this equality is a Gaussian random variable with zero expectation.

This variance serves to calculate automatically the Kalman gain which weights the resetting in order to take into account different noises (dynamic noises linked to the external environment and measurement noises of the magnetometers).

In yet another approach, a calculation by linear filtering using the same type of modelling and characterisation is implemented.

In this approach, it is the relative adjustment of the amplitude of the gain of the equation which characterises the relevance thereof. In general, this gain is adjusted by hand. Those skilled in the art will then know how to weight it as a function of the relevance of the modelling.

Thus, in these two approaches, the parameters characterising the relevance of the model (variance in Gaussian noise in the case of the Kalman filter, gain in the case of linear filtering) are generally constant parameters, independent of the measured magnetic field.

Characterisations of the relevance of the modelling taking into account the measured magnetic field have recently been proposed, for example in the publications, W. T. Faulkner, R. Alwood, W. T. David, and J. Bohlin, "Gps-denied pedestrian tracking in indoor environments using an imu and magnetic compass," in *Proceedings of the* 2010 *International Technical Meeting of The Institute of Navigation*, (San Diego, Calif.), pp. 198-204, January 2010.

M. H. Afzal, V. Renaudin, and G. Lachapelle, "Magnetic field based heading estimation for pedestrian navigation environments," in 2011 *International Conference on Indoor Positioning and Indoor Navigation*, (Guimaraes, Portugal), September 2011.

The characterisations thereby carried out do not however give entire satisfaction.

This is the case in particular in environments where the magnetic field is considerably disturbed, notably "indoors" or in urban areas, where magnetic disturbances stemming from electrical currents or metal elements in buildings are superimposed on the Earth's magnetic field.

GENERAL DESCRIPTION OF THE INVENTION

A general aim of the invention is to propose a solution enabling better characterisation of the relevance of the modelling used, notably in highly disturbed environments.

Notably, the invention proposes a method for determining a heading, in which a magnetic field is measured by at least one magnetometer and a magnetic heading is determined from said measurement and in which calculation means implement a processing calculating, for each measurement of magnetic heading, a value for characterising the heading thereby determined, characterised in that said characterisation value is a function of the measured magnetic field gradient, said value being used in the determination of the heading.

In particular, said characterisation value is a monotone function, preferentially increasing (the example of a linear function of directly positive coefficient will be taken), of a norm of the gradient, in particular the norm L2.

It will be understood that said characterisation value could be a decreasing function of the norm of the gradient if for example it is arbitrarily decided that the characterisation value has lower and lower values when the heading is more and more disturbed.

The calculation means determine for a given sampling time:

an estimation of a heading prediction which is a function of the heading determined at the preceding sampling time, a resetting of the predicted heading thereby estimated as a function of a magnetic heading determined from magnetometer measurements, and in which the resetting is determined as a function of said characterisation value, and advantageously still a monotone function (in particular increasing) of the characterisation value.

Said resetting is thus advantageously a function of the gradient of the measured magnetic field, and in particular a monotone function (by composition of monotone functions) of the norm of the gradient. In this way, the fact that, the more the environment is disturbed, the higher the gradient and thus the more the heading measurement is falsified, is taken into account.

In a preferential embodiment, the calculation means estimate the amplitude of the resetting as a function:

of a model of the change in the magnetic disturbances between two sampling times and of an a priori estimation of the amplitude of the disturbances.

In this way, the processing takes into account the change in the magnetic heading disturbance between two sampling times and takes account of the potential spatial correlation of the disturbance due to the environment in the case of successive sampling times.

The calculation that results therefrom is more reliable than in the prior art.

Notably, for a given sampling time k+1, the calculation means estimate a linked heading disturbance by calculating $$\psi^{(d)}[k+1] = \alpha[k](\psi^{(d)}[k] + \hat{u}[k]) + (1-\alpha[k])\frac{\hat{u}[k]}{2} + v_{\psi^{(d)}}[k]$$

where $$\alpha[k] = 1 - \frac{\sigma_u[k]^2}{2a[k]^2}$$

and $v_{\psi^{(d)}}$ is a Gaussian random variable of variance $$a[k]^2(1-a[k]^2)$$

k being the preceding sampling time, a[k] being a parameter that represents the a priori amplitude of the magnetic disturbance, $\hat{u}$ and $\sigma_u$ being two parameters calculated by the calculation means as an estimation of the expectation and the variance in the change in the disturbance.

Advantageously, the calculation means estimate the parameter a[k] as a linear function of the norm of the magnetic field gradient.

The parameter $\hat{u}[k]$ is for its part for example calculated by the calculation means as the difference between the magnetic headings determined directly from the magnetometer outputs for the times k+1 and k, from which is subtracted the change in predicted heading ($\omega[k]dt$).

The parameter $\sigma_u$ may be estimated as a function of the velocity of displacement or the displacement between two successive sampling times.

The processing implements for example a Kalman filtering of which the state has at least as parameter the real heading and the magnetic heading disturbance ($\psi, \psi^{(d)}$)

The heading prediction may be determined as a function of measurements of one or more sensors of an inertial unit.

The invention further relates to a device for determining a heading by magnetic sensors, comprising magnetometers and calculation means for the calculation of the heading from the magnetic field measured by said magnetometers, characterised in that the calculation means implement, for different successive sampling times, the aforesaid processing.

It also proposes a magneto-inertial navigation system comprising at least one such heading measurement device.

Such a system is advantageously used in urban environments or inside buildings.

The invention also relates to:

a computer programme product including code instructions for the execution of a method of the aforesaid type, when said programme is executed on a computer;

a storage means readable by a computer equipment on which a computer programme product includes code instructions for the execution of such a method.

DESCRIPTION OF THE FIGURES

Other characteristics and advantages of the invention will become clearer from the description that follows, which is purely illustrative and non-limiting, and which should be read with regard to the appended figures in which.

DESCRIPTION OF ONE OR MORE EMBODIMENTS

General Remarks—Measurement Device

Figure 1:
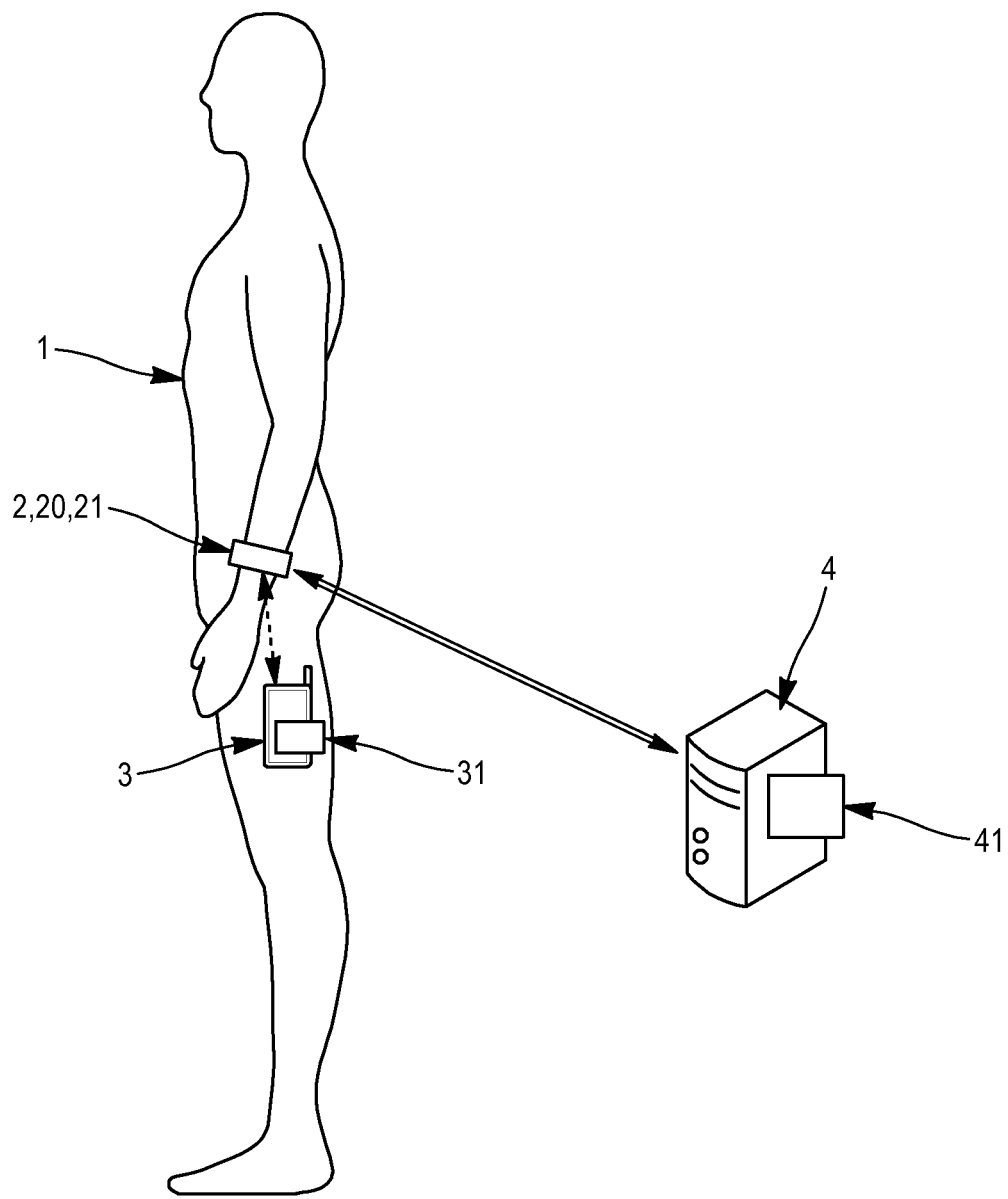
FIG. 1 is a diagram of equipment for the implementation of the method according to the invention.

With reference to FIG. 1, the proposed measurement device is for example used for the estimation of the movement of an object 1 moving in an ambient magnetic field (typically the Earth's magnetic field, which could be slightly altered by nearby metal objects), noted $\vec{B}$. As is known, the magnetic field is a three-dimensional vector field, that is to say associating a vector of three dimensions with each three-dimensional point in which the object is moveable.

This object 1 may be any moveable object of which knowledge of the position is desired, for example a wheeled vehicle, a drone, etc., but also a pedestrian.

The object 1 comprises in a case 2 (support) a plurality of magnetic measurement sensors 20, i.e. axial magnetometers 20. Axial magnetometer is taken to mean an element capable of measuring a component of said magnetic field, i.e. the projection of said magnetic field vector B at the level of said magnetometer 20 along its axis.

More precisely, the magnetometers 20 are integral with the case 2. They have a movement substantially identical to the case 2 and to the object 1 in the terrestrial reference frame.

In a preferred manner, the reference frame of the object 1 is provided with an orthonormal cartesian point of reference in which the magnetometers 20 have a predetermined position in this point of reference.

Figure 2:
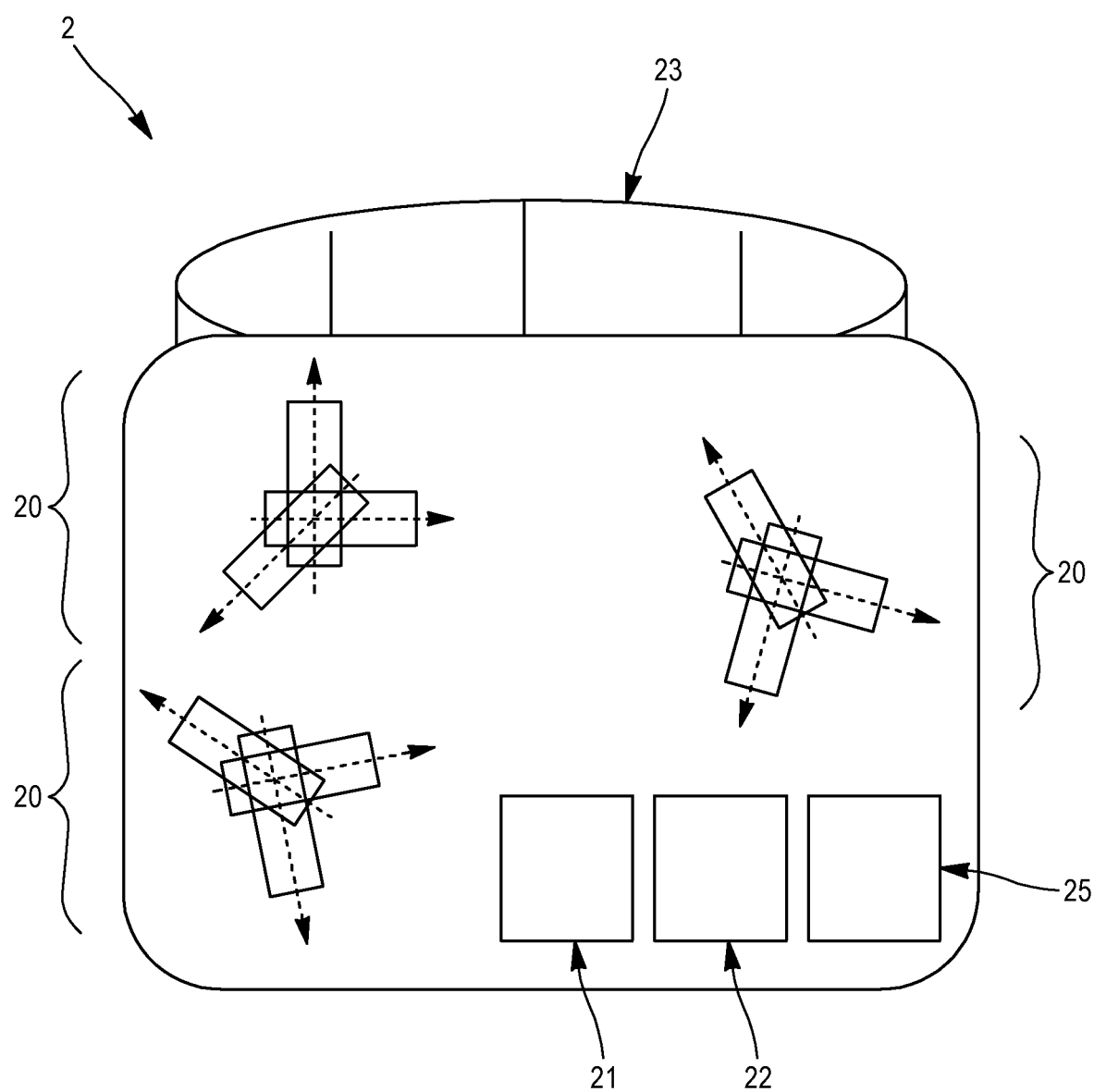
FIG. 2 represents in greater detail an example of case for the implementation of the method according to the invention.

In FIG. 2, the case 2 is fixed onto the object 1 (for example a limb of the pedestrian) by attachment means 23. These attachment means 23 consist for example of a bracelet, for example a self-gripping strap that grips the limb and enables an integral link.

Obviously, the invention is not limited to the estimation of the movement of a pedestrian, but it is particularly advantageous in such a use because it enables very reduced bulk, which is necessary for the case to be portable by a human in an ergonomic manner.

The case 2 may include calculation means 21 (typically a processor) for implementing directly in real time the processing operations of the present method, or instead the measurements may be transmitted via communication means 25 to an external device such as a mobile terminal (smartphone) 3, or even a remote server 4, or instead the measurements may be recorded in local data storage memory means 22 (a flash type memory for example) for a posteriori processing for example on the server 4.

The communication means 25 may implement a short range wireless communication, for example Bluetooth or Wi-Fi (in particular in an embodiment with a mobile terminal 3) or even be means for connecting to a mobile network (typically UMTS/LTE) for a long distance communication. It should be noted that the communication means 25 may be for example a wired connection (typically USB) for transferring data from the local data storage means 22 to those of a mobile terminal 3 or a server 4.

If it is a mobile terminal 3 (respectively a server 4) that hosts the "intelligence", it includes calculation means 31 (respectively 41) such as a processor for implementing the processing operations of the present method that are going to be described. When the calculation means used are those 21 of the case 2, it may further include communication means 25 for transmitting the estimated position. For example, the position of the bearer may be sent to the mobile terminal 3 to display the position in a navigation software interface.

The data calculation means 21, 31, 41 respectively of the case 2, a smartphone 3 and a remote server 4 may indifferently and according to the applications carry out all or part of the steps of the method.

They each comprise to this end storage means in which are memorised all or part of the sequences of code instructions for the execution of the method.

Prediction and Resetting

Figure 3:
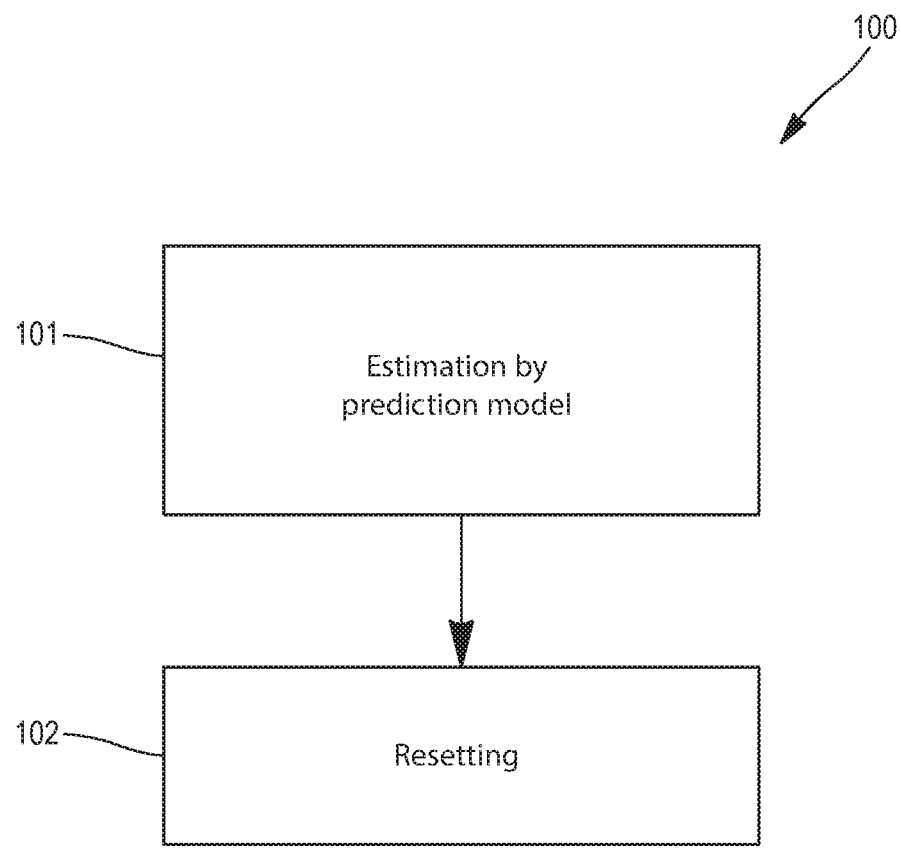
FIG. 3 illustrates the main steps of a method complying with an embodiment of the invention.

The calculation means implement (FIG. 3) a filtering 100 calculating on the one hand an estimation of the heading value by prediction (step 101) and on the other hand implementing a resetting as a function of an error estimation (step 102).

Notably, knowing the angular velocity ω given for example by a gyrometer, step 101 calculates the heading $\psi_{k+1}$ at a time k+1 as equal to $$\psi_{k+1} = \psi_k + \omega \cdot \Delta t$$

where $\psi_k$ is the heading at the preceding time k and where $\Delta t$ is the duration separating these two sampling times.

The resetting 102 takes into account the measurements carried out by the magnetometers 20.

Hereafter, the measurement of the magnetic heading (derived from the measurements of the magnetometers) for a given time k is noted $z_\psi[k]$, with $$z_\psi[k] = \psi_k$$

Typically, the magnetic heading is given by $$z_\psi[k] = \mathrm{atan}\left(\frac{My[k]}{Mx[k]}\right)$$

where My and Mx are two horizontal components of the magnetic field in a terrestrial reference frame, these two components being calculated as a function of the attitude determined for the object 1 by an inertial unit thereof.

The calculation means calculate the reset heading $\psi_{k+1}^{reset}$ corresponding to the time k+1 as equal to the sum of the heading estimated $\psi_{k+1}$ at this time and a resetting which is advantageously a function:

of a gain $K_k$ calculated or adjusted with respect to the preceding time k of an estimation of the error $\mathrm{Err}(\psi_{k+1}, z_\psi)$ between the predicted heading $\psi_{k+1}$ and the measurement $z_\psi$.

Thus, the calculation means use the magnetic heading derived from the measurement by the magnetometers to reset the state, and in particular the heading, by calculating $$\psi_{k+1}^{reset} = \psi_{k+1} + K_k \cdot \mathrm{Err}(\psi_{k+1}, z_\psi)$$

Typically, the error $\mathrm{Err}(\psi_{k+1}, z_\psi)$ may be a simple difference between the predicted heading, estimated at the time k+1 (before resetting), and the magnetic heading $z_\psi$ derived from the magnetometer measurements.

Other error functions are nevertheless possible, notably in the case of non-linear filtering.

In particular, the resetting $K_k$, $\mathrm{Err}(\psi_{k+1}, z_\psi)$, and more particularly gain $K_k$, may advantageously depend on the magnetic field gradient measured by the magnetometers 20. As explained previously, the gain $K_k$ is preferentially a monotone function, in particular increasing, of a norm of the gradient.

In this way, the resetting correction is all the more important when the magnetic field varies strongly and is thus liable to induce important errors in the heading measurement.

The reset heading value thereby obtained is stored by said calculation means 21, 31, 41 and/or used by said means for the remainder of the processing and for the calculations of magneto-inertial navigation information (linear velocity, angular velocity, position, heading, etc.).

Also, it may be transmitted by the calculation means to interface means, for

Model of Change in Disturbances Linked to the Environment

An example of possible calculation of the resetting in which the measurement of magnetic heading $z_\psi$ is corrected by an estimation of the disturbance of the magnetic field linked to the environment is detailed hereafter.

The magnetic heading $z_\psi$ derived from the measurement by the magnetometers may in fact be considered as broken down as follows:

$$z_\psi = \psi + \psi^{(d)} v_{z_\psi}$$

where:

$\psi$ corresponds to the real heading that it is sought to determine, $v_{z_\psi}$ corresponds to a Gaussian measurement error and, $\psi^{(d)}$ ("d" for disturbance) corresponds to a magnetic heading disturbance linked to the environment (typically, disturbances linked to metal infrastructures and electric cables in urban environments or in buildings).

The magnetic heading disturbance linked to the environment is highly correlated spatially. The magnetic field linked to disturbances in the environment is in fact a continuous vector field and the magnetic fields at two given points A and B are all the closer when these two points A and B are neighbouring in space.

In an embodiment, the heading disturbance $\psi^{(d)}$ linked to the environment is estimated by the calculation means by means of a formulation taking into account the change correlations that can be expected for the disturbances in magnetic field between two successive sampling times (temporal, spatial correlation or more complex).

This estimation is constructed to enable a Markovian model (which may be used in a recursive filter) for the change $\psi_d$ and makes it possible to take into account a model of the change in the magnetic heading disturbance (temporal, spatial correlation or more complex)

makes it possible to construct a filtering model for which the heading is observable (otherwise, any hope of constructing a heading estimator is lost).

In the proposed estimation, the amplitude of the resetting is estimated as a function of a model of the change in magnetic disturbances between two sampling times and an a priori estimation of the amplitude of the disturbances.

The Inventors have found (and mathematically verified) that in the case of a spatial correlation (case of disturbances in urban areas or indoors), a suitable estimation of the change in disturbance $\psi^{(d)}$ between two sampling times separated by a time step advantageously as follows:

$$\psi^{(d)}[k+1] = \alpha[k](\psi^{(d)}[k] + \hat{u}[k]) + (1-\alpha[k])\frac{\hat{u}[k]}{2} + v_{\psi^{(d)}}[k]$$

where $$\alpha[k] = 1 - \frac{\sigma_u[k]^2}{2a[k]^2}$$

and $v_{\psi}^{(d)}$ is a random Gaussian variable of variance $$a[k]^2(1-a[k]^2)$$

a[k] being a parameter which represents the a priori amplitude of the magnetic disturbance, $\hat{u}$ and $\sigma_u$ being the expectation and the variance of a random variable which is a model (in the form of a random Gaussian variable) of the variation in the magnetic heading disturbance between 2 sampling times. $v_{\psi}^{(d)}$ is an estimation taking into account the noise of the magnetometers.

This estimation is subtracted from $z_{\psi}$ for the error calculation, this being able to be directly calculated between $\psi_{k+1}$ and $(z_{\psi}-\psi^{(d)}[k+1])$, or confined to a Kalman type filtering which has both $\psi^{(d)}$ and $\psi$ in its state.

Determination of the Parameter a[k]

The parameter a[k] represents the a priori amplitude of the magnetic heading disturbance. It characterises the heading and is for example calculated as a linear function of a norm of the magnetic field gradient, which is an example of monotone function.

For example, $$a[k]=a_0+a_1N[k]$$

with $N[k]=\|\vec{\nabla B}[k]\|$, that is to say the norm L2. Other norms could however be used such as the norm L1, the Frobenius norm or any other norm.

$a_0$ and $a_1$ being two parameters fixed beforehand before implementation of the filtering processing, $\hat{B}[k]$ as long as the magnetic field is at time k. The function a[k] is increasing of the norm from the moment that $a_1$ is positive.

Alternatively other monotone functions could be used, for example a quadratic function of parameters adequately chosen from among the components of the gradient.

In this way, as indicated above, the resetting term $K_k$,Err) $\psi_{k+1},z_{\psi}$) is a monotone function of gain $K_k$, itself a monotone function of the norm of the magnetic field gradient measured by the magnetometers 20, which enables an efficient correction.

Other methods are possible to determine the parameter a[k].

Notably, a[k] may also be determined by comparison with a model of the Earth's magnetic field, for example by implementing techniques such as proposed in the publication:

"Assessment of Indoor Magnetic Field Anomalies using Multiple Magnetometers Assessment of Indoor"—M. H. Afzal, V. Renaudin, G. Lachapelle—Proceedings of the 23rd International Technical Meeting of The Satellite Division of the Institute of Navigation (ION GNSS 2010) Sep. 21-24, 2010.

The solutions in which the parameter a[k] is a function of the magnetic field gradient enable however better corrections, and do not require models of the Earth's magnetic field.

Determination of the Parameter $\hat{u}$

The term $v_{\psi}^{(d)}$ may be considered in a first approximation as negligible and be considered as zero in the calculation.

The parameter $\hat{u}[k]$ represents the most probable value for the change in the disturbance.

This parameter is for example calculated using gyrometers that are assumed correct in the short term. The most probable change in the disturbance is then given by the difference between the change in the magnetic heading measurement and the change in the gyrometric heading:

$$\hat{u}[k] = E[\psi^{(d)}[k+1] - \psi^{(d)}[k]]$$
$$= E\left[\underbrace{\psi^{(d)}[k+1] + \psi[k+1]}_{\text{magnetic heading measured at time } k+1} - \underbrace{(\psi^{(d)}[k] + \psi[k])}_{\text{magneic heading measured at timek}} - \underbrace{(\psi[k+1] - \psi[k])}_{\text{change in heading}}\right]$$
$$= z_{\psi}[k+1] - z_{\psi}[k] - \omega[k]dt$$

where: E[·] is the mathematical expectation, ω[k] is the gyrometric rotation velocity and dt is the sampling pitch.

Thus, the parameter $\hat{u}[k]$ is calculated by the calculation means as the difference between the magnetic headings determined directly from the magnetometer outputs for the times k+1 and k, from which is subtracted the predicted rotation ω[k]dt.

Determination of the Parameter $\sigma_u$

The parameter $\sigma_u$ represents the image of the correlation between the disturbance at step k and that at step k+1.

It is possible to choose advantageously to index it on the velocity of displacement (or on the displacement between two successive sampling times, which is similar) in such a way as to take account of the spatial correlation of the magnetic disturbances.

One could for example take $\sigma_u = c \cdot \|v\|$ where c is an adjustment coefficient.

Other Embodiment

In another embodiment, different values of magnetic heading are combined, in order to obtain a variable value dependent on the heading that is the least possible marred by errors linked to magnetic disturbances.

The variable that it is sought to determine is for example the average heading of a portion of trajectory, other heading dependent variables obviously being able to be envisaged.

To do so, the calculation means record, for each sampling pitch k, the value of the measured magnetic heading $z_{\psi}[k]$ and the value of the characterisation of the magnetic heading called a[k], calculated as a monotone function of a norm of the gradient.

For example, $a[k]=a_0+a_1\|\nabla B\|$

The most probable heading $\hat{\psi}[[k_0,k_1]]$ for the portion of trajectory defined between two sampling times $k=k_0$ and $k=k_1$ may thus be posed in the form of an optimisation $$\hat{\psi}_{[k_0,k_1]} = \underset{\hat{\psi}}{\mathrm{argmin}} \Sigma_k \, 1/a[k] \|z_\psi[k] - \hat{\psi}\|^2$$

where $\|\cdot\|$ is a norm (L1, L2 or other).

The optimisation algorithm implemented by the calculation means may be of any suitable type: gradient descent, Levenberg-Marquardt algorithm, or Metropolis-Hastings algorithm.

Furthermore, in the case of the norm L2, the problem is then posed in the form of a least squares and the calculation means determine directly $$\hat{\psi}_{[k_0,k_1]} = \frac{\Sigma_{k_0}^{k_1} z_\psi[k]/a[k]}{\Sigma_{k_0}^{k_1} (1/a[k])}$$

It will be easily understood that this value is much more advantageous than the average value non-weighted by the characterisation value since the times k where the magnetic disturbance is the strongest have much less impact in the weighted average than in the non-weighted average.

The invention claimed is:

1. A method for determining a heading, in which a magnetic field is measured by at least one magnetometer and a measured magnetic heading is determined from each measurement of the magnetic field and in which a calculation unit implements a process calculating, for each measured magnetic heading, a characterization value for characterising the measured magnetic heading thereby determined, wherein said characterisation value is a monotone function of a norm of a measured magnetic field gradient, said characterization value being used in the determination of the heading.

2. The method according to claim 1, in which the calculation unit determines for a given sampling time:
an estimation of a heading prediction which is a function of the heading determined at the preceding sampling time,
a resetting of the predicted heading thereby estimated as a function of a magnetic heading determined from magnetometer measurements,
and wherein the resetting is determined as a function of said characterisation value.

3. The method according to claim 1, wherein the calculation unit determines a value of a variable dependent on the heading as a function of a plurality of measured magnetic headings and characterisation values.

4. The method according to claim 2, wherein the magnetic field has magnetic disturbances and the calculation unit estimates an amplitude of the resetting as a function:
of a model of a change in the magnetic disturbances between two sampling times and
of an a priori estimation of an amplitude of the magnetic disturbances.

5. The method according to claim 2, wherein, for a given sampling time k+1, the calculation unit estimates a linked heading disturbance by calculating $$\alpha[k](\psi^{(d)}[k] + \hat{u}[k]) + (1-\alpha[k])\frac{\hat{u}[k]}{2} + v_{\psi^{(d)}}[k]$$

where $$\alpha[k] = 1 - \frac{\sigma_u[k]^2}{2a[k]^2}$$

where $v_\psi^{(d)}$ is a Gaussian random variable of variance $a[k]^2(1-\alpha[k]^2)$,
k being the preceding sampling time,
$\psi^{(d)}$ being a parameter which represents a magnetic heading disturbance linked to the environment,
a[k] being a parameter which represents the a priori amplitude of the magnetic disturbance,
$\hat{u}$ and $\sigma_u$ being two parameters calculated by the calculation unit as an estimation of the expectation and the variance in the change in disturbance.

6. The method according to claim 5, wherein the calculation unit estimates the parameter a[k] as a linear function of the norm of the magnetic field gradient.

7. The method according to claim 5, wherein the parameter $\hat{u}[k]$ is calculated by the calculation means unit as the difference between the magnetic headings determined directly from the magnetometer outputs for the times k+1 and k, from which is subtracted a predicted heading change $(\omega[k]dt)$ where $\omega[k]$ is a gyrometric rotation velocity and dt is a sampling pitch.

8. The method according to claim 5, wherein the parameter $\sigma_u$ is estimated as a function of the displacement velocity or the displacement between two successive sampling times.

9. The method according to claim 5, wherein the processing implements a Kalman filtering of which the state has at least as parameter the heading and the magnetic heading disturbance $(\psi, \psi^{(d)})$.

10. The method according to claim 1, wherein the heading prediction is determined as a function of measurements of one or more sensors of an inertial unit.

11. A device for determining a heading by magnetic sensors, comprising magnetometers and calculation unit for the calculation of the heading from the magnetic field measured by said magnetometers, wherein the calculation unit implements, for different successive sampling times, the processing of the method according to claim 1.

12. A magneto-inertial navigation system comprising at least one magnetic field measurement device according to claim 11.

13. Use of the magneto-inertial navigation system according to claim 12 in applications in urban environments or inside buildings.

14. A non-transitory computer readable programme product including code instructions for the execution of a magnetic field measurement method according to claim 1, when said programme is executed on a computer.

15. A non-transitory storage medium readable by a computer equipment wherein a computer programme product includes code instructions for the execution of a magnetic field measurement method according to claim 1.

* * * * *